J. A. MERRILL & D. W. KEMPTON.
Car-Couplings.
No. 143,524. Patented Oct. 7, 1873.
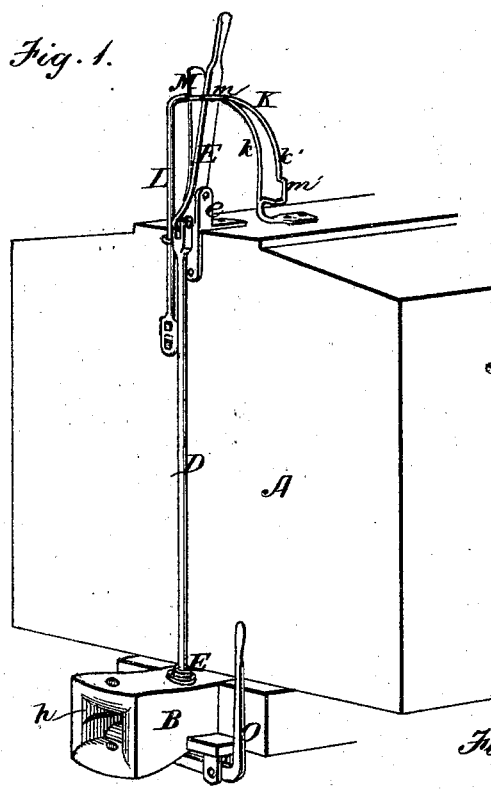
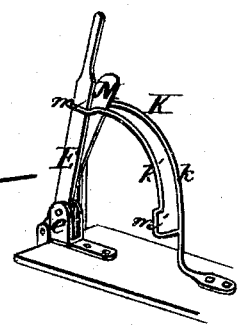
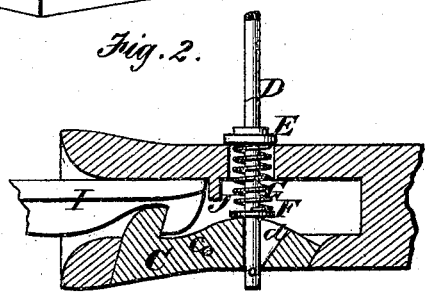
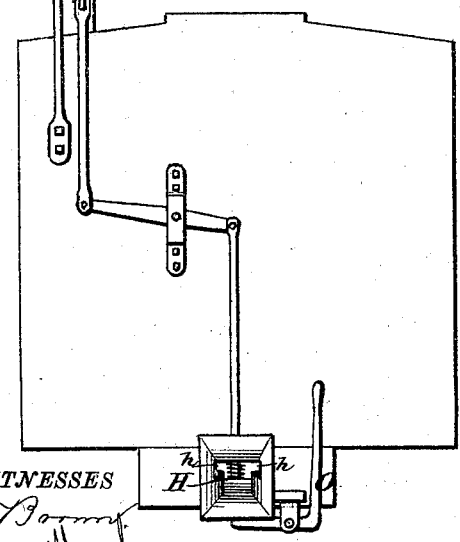
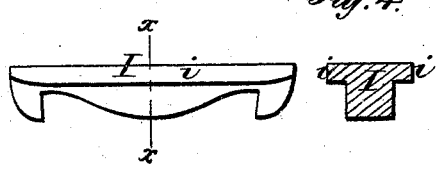
WITNESSES
INVENTORS
J. A. Merrill
D. W. Kempton

UNITED STATES PATENT OFFICE.

JAY A. MERRILL AND DAVID W. KEMPTON, OF DENVER, COLORADO TER.

IMPROVEMENT IN CAR-COUPLINGS.

Specification forming part of Letters Patent No. 143,524, dated October 7, 1873; application filed August 8, 1873.

*To all whom it may concern:*

Be it known that we, JAY A. MERRILL and DAVID W. KEMPTON, both of Denver, in the county of Arapahoe and Territory of Colorado, have invented a new and Improved Car-Coupling; and we do hereby declare the following to be a full and exact description of the same, reference being had to the accompanying drawing forming part of this specification, in which—

Figure 1 is a perspective view of a freight-car provided with my invention. Fig. 2 is a section of the draw-head. Fig. 3 is a side elevation of the double coupling-hook. Fig. 4 is a section through line $x$ $x$ of Fig. 3. Fig. 5 is a detached perspective view of the device for holding the lever on the top of the car; and Fig. 6 is a front elevation of a car, showing a different arrangement of levers.

Similar letters of reference in the accompanying drawings denote the same parts.

This invention relates to car-couplings employing a hook in the draw-head in place of the common pin; and has for its object to provide for the public a self-coupling device, adapted principally for freight-cars, which shall be simple in its construction, sure and efficient in its operation, and obviate the necessity of an attendant going between the cars to couple or uncouple the same. To these ends the invention consists in the peculiar construction of the draw-head and coupling devices, as I will now proceed to describe.

In the drawings, A represents a freight-car, and B the draw-head, in the lower side of which is pivoted, at $c$, the coupling-hook C. D is a vertical rod extending from the lever E at the top of the car, and passing through an enlarged orifice in the draw-head B and a tapering orifice, $d$, in the rear end of the hook C, as shown in Fig. 2, its lower end being provided with a suitable pin, so that when raised it will elevate the rear end of the hook. The rod D is provided, near the upper surface of the draw-head, with a fixed collar, E, and on the upper surface of the hook C with a loose washer, F. Between the collar E and washer F is a spiral spring, G, which bears down on the rear end of the hook, and holds its forward end up to its work. The front end of the chamber H of the draw-head is somewhat T-shaped, as shown in Fig. 6, in order to hold firmly and keep from sagging the correspondingly-shaped double hook I, which slides freely in the chamber H, but fits it sufficiently close to be held in a nearly horizontal position. The grooves $h$ $h$ in the sides of the chamber H are widened at the mouth of the latter, as shown in Fig. 1, their lower sides tapering downward, while the lower sides of the corresponding flanges $i$ of the hook I taper upward at each end, as shown in Fig. 3. The entrance of the hook into the chamber is thus facilitated when the hook happens to be slightly inclined, or when there is some variation between the heights of the draw-heads, and any sharp concussion between the end of the hook and the draw-head is prevented. J represents a stop in the chamber H to prevent the end of the hook I from coming in contact with the spring G and rod D. The lever E is curved outward at its lower end, and is pivoted between ears $e$ on the roof of the car, as shown, the rod D being jointed to its lower end. The upper end of the lever D works in a curved guide, K, composed of two parallel curved pieces, $k$ $k'$, supported at the end of the car by a vertical rod, L. The lever E is provided on one side with a curved spring, M, attached to its lower end, and inclined outward at the upper end, where it bears against the part $k$ of the guide K, and presses the lever against the opposite part $k'$, which is provided with recesses $m$ $m'$, adapted to hold the lever, which has sufficient lateral play to enable the spring M to force it into said recesses.

It will be seen that when the double hook I is in its place in the draw-head of one car its outer end projects horizontally, and on being forced into the draw-head of an adjacent car its projecting hook passes over the pivoted hook C, the latter yielding to allow it to pass, and afterward returning to place, where it is held by the spring G.

To uncouple, the attendant on the roof of the car throws back the upper end of the lever E, first pressing the latter inward to disengage it from the recess $m$. This operation raises the rod D, and with it the rear end of the hook C, thus disengaging its forward end from the coupling-hook I. If it is desirable or necessary to hold the hook C in this position—that is, out of connection with the coupling-hook I, the lever E is engaged with the lower orifice $m$, where it is held by the spring M. This feature is of importance when a car is to be uncoupled from another not in motion, as the brakeman can leave the lever in the proper position, and is not obliged to remain on the roof until the train starts in order to uncouple the car.

For operating the coupling by a person standing on the ground or on the platform, I provide a bell-crank lever, O, which is pivoted at one side of the draw-head, as shown in Figs. 1 and 6, so as to press upward against the bottom of the hook C at its rear end. This, however, is designed for use only in exceptional cases.

In Fig. 6, I have shown a modification of the device for operating the hook C, in which the lever E is located at one side of the car instead of in the center. This arrangement leaves unobstructed the "runway" or passage along the center of the car.

The whole arrangement of parts is simple, and the operation is certain and effective. The pivoted hook C is held up to its work by the spring G, and is not liable to become disengaged, while at the same time it can be held out of connection as long as desired, as before mentioned. The front of the draw-head is provided with orifices for the reception of the ordinary pin, which can be used, if desired, with a link. The stop J protects the spring G from the hook I, which otherwise might enter the chamber sufficiently far to damage the spring.

We claim as our invention—

1. The hook C, provided with the tapering slot or orifice $d$, in combination with the vertical rod D and spring G, substantially as described.

2. In a draw-head containing a pivoted hook to be operated by a spring-rod passing through the chamber, the stop J, adapted to protect the spring G from the coupling hook or link, substantially as described.

JAY A. MERRILL.
D. W. KEMPTON.

Witnesses:
   NATHAN K. ELLSWORTH,
   MELVILLE CHURCH.